US006910100B2

(12) United States Patent
Lewalski-Brechter

(10) Patent No.: US 6,910,100 B2
(45) Date of Patent: Jun. 21, 2005

(54) DETECTING OPEN WRITE TRANSACTIONS TO MASS STORAGE

(75) Inventor: Norbert Lewalski-Brechter, Neudenau (DE)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 10/097,075

(22) Filed: Mar. 13, 2002

(65) Prior Publication Data

US 2003/0177307 A1 Sep. 18, 2003

(51) Int. Cl.[7] ............................................. G06F 12/16
(52) U.S. Cl. ........................... 711/114; 711/156; 714/5; 714/6; 714/7; 714/8
(58) Field of Search .................... 711/111, 112, 114, 711/170, 156; 714/5, 6, 7, 8, 52, 800, 801, 805

(56) References Cited

U.S. PATENT DOCUMENTS

| | | | | |
|---|---|---|---|---|
| 5,517,632 A | * | 5/1996 | Matsumoto et al. | 711/114 |
| 5,856,989 A | * | 1/1999 | Oldfield et al. | 714/801 |
| 5,893,164 A | * | 4/1999 | Legg | 711/156 |
| 6,751,038 B1 | * | 6/2004 | Wada | 360/53 |

FOREIGN PATENT DOCUMENTS

EP            825534 A2 *  2/1998

OTHER PUBLICATIONS

Lewalski–Brechter, "Journaling Technique for Write Transactions to Mass Storage," U.S. Appl. No. 10/097,166, filed Mar. 13, 2002.

* cited by examiner

*Primary Examiner*—B. James Peikari
(74) *Attorney, Agent, or Firm*—Trop, Pruner & Hu, P.C.

(57) ABSTRACT

In accordance with some embodiments of the present invention, an indicator may be provided to indicate whether a write transaction to a drive of an array of drives has completed. If the write transaction has not been completed, a recovery may be performed in some embodiments. The indicator may be reset when the transaction completes successfully.

30 Claims, 8 Drawing Sheets

DETECTING OPEN WRITE TRANSACTIONS TO MASS STORAGE

BACKGROUND

The invention generally relates to write transactions to mass storage, such as an array of disk drives, for example.

A redundant array of inexpensive disks (RAID) (called a "RAID array") is often selected as the mass storage for a computer system due to the array's ability to preserve data even if one of the disk drives of the array should fail. As an example, in an arrangement called RAID4, data may be stored across three disk drives of the array, with a dedicated drive of the array serving as a parity drive. Due to the inherent redundancy that is presented by this storage technique, the data from any three of the drives may be used to rebuild the data on the remaining drive. In an arrangement known as RAID5, the parity information is not stored on a dedicated disk drive, but rather, the parity information is stored across all drives of the array. Other RAID techniques are commonly used.

The RAID array may be part of a cluster environment, an environment in which two or more file servers share the RAID array. For purposes of ensuring data consistency, only one of these file servers accesses the RAID array at a time. In this manner, when granted the exclusive access to the RAID array, a particular file server may perform the read and write operations necessary to access the RAID array. After the particular file server finishes its access, then another file server may be granted exclusive access to the RAID array. For purposes of establishing a logical-to-physical interface between the file servers and the RAID array, one or more RAID controllers typically are used. As examples of the various possible arrangements, a single RAID controller may be contained in an enclosure that houses the RAID array, or alternatively, each file server may have an internal RAID controller. In the latter case, each file server may have an internal RAID controller card that is plugged into a card connector slot of the file server.

For the case where the file server has an internal RAID controller, the file server is described herein as accessing the RAID array. However, it is understood that in these cases, it is actually the RAID controller card of the server that is accessing the RAID array. Using the term "server" in this context, before a particular server accesses the RAID array, the file server that currently is accessing the RAID array closes all open read and write transactions. Hence, under normal circumstances, whenever a file server is granted access to the RAID array, all data on the shared disk drives of the array are in a consistent state.

As noted above, the RAID array is designed to permit the recovery of the data on one of the disk drives of the array should a drive fail. However, a situation may occur in which a file server that owns the access right to the RAID array fails during its access to the array. For example, one of the servers, while accessing the RAID array, may fail due to a power failure. In response to this failure, the cluster management software (part of the server operating system) on one of the remaining servers of the cluster elects a suitable server to replace the failed server.

However, if the file server fails during a critical point of the access, inconsistency between the user data and parity data that the server has stored in the array during the access may occur. For example, in order for the file server to write a block of user data that is passed to the file server to the RAID array, the server performs five steps: 1. the server reads the old corresponding block of data from the RAID; 2. the server reads the old block of parity data from the RAID array; 3. using the old parity and user data, the server calculates the block of new parity data; 4. the server writes new user data to the RAID array; and 5. the server writes the block of new parity data to the RAID array. Disruption of the file server while the server is writing the new user data or the new parity data may present potential problems later on, for example, when a member disk drive of the array fails and an attempt is made to rebuild user data on the failed drive from the parity information. Thus, the parity inconsistency in this scenario may eventually lead to data corruption.

Thus, there is a continuing need for an arrangement that addresses one or more of the problems that are stated above.

DETAILED DESCRIPTION

Figure 1:
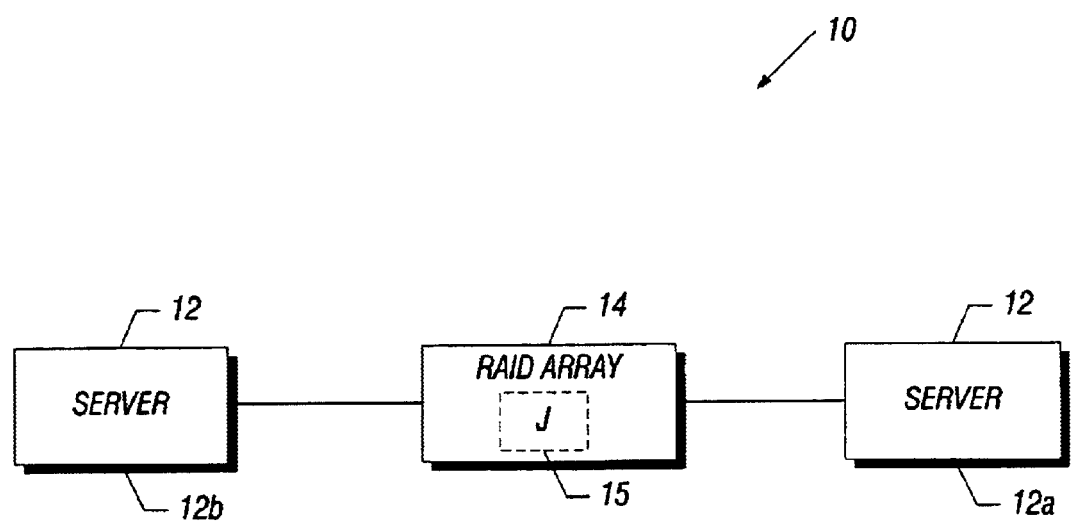
FIG. 1 is a schematic diagram of a computer system according to an embodiment of the invention.

Referring to FIG. 1, an embodiment 10 of the computer system in accordance with the invention includes file servers 12 (file servers 12a and 12b, depicted as examples) that are arranged in a cluster to share access to a Redundant Array of Inexpensive Disks (RAID) array 14. In this manner, each server 12 performs an access to the RAID array 14 to the exclusion of the other servers 12. In accordance with an embodiment of the invention, for purposes of preventing the failure of a particular server 12 from corrupting data on the RAID array 14, the servers 12 maintain a journal on 15 of open transactions. In particular, before performing a particular write transaction to the RAID array 14, each server 12 records the data to be written in the write transaction in the journal 15. Although two file servers 12a and 12b are depicted in FIG. 1, in some embodiments of the invention, the computer system 10 may include more than two file servers 12.

The journal 15 stores data for the most recent write transactions that have been performed or are to be performed to the RAID array 14. Due to the journal 15, should one of the servers 12 fail during its access to the array 14, the transactions that were supposed to be performed on the RAID array 14 during the access may be reconstructed by an elected substitute server 12 that has not failed. Thus, data consistency is preserved in the RAID array 14, even if one of the servers 12 fails during an access to the array 14.

In some embodiments of the invention, when a particular server 12 is to perform a write transaction to the RAID array 14, the server 12 first posts the data to be written to the RAID array 14 to the journal 15. Thus, the corresponding data in the journal 15 initially indicates an "open transaction" to be performed to the RAID array 14. Therefore, should the server 12 fail during its access to the RAID array 14, so that the server 12 does not complete one or more open transactions, another server 12 may perform the transactions that were supposed to be performed by the first server 12 during the access. It is noted that, as described below, when performing the transactions posted to the journal 14, some of the transactions that were completed by the failed server 12 may be replayed by the selected substitute server 12.

As depicted in FIG. 1, in some embodiments of the invention, the journal 15 may be stored on one or more of the disk drives of the RAID array 14. However, in other embodiments in the invention, the journal 15 may be stored in another memory, such as a dynamic random access memory (DRAM), a flash random access memory (RAM), or another type of RAM or semiconductor memory, as just a few examples.

Figure 2:
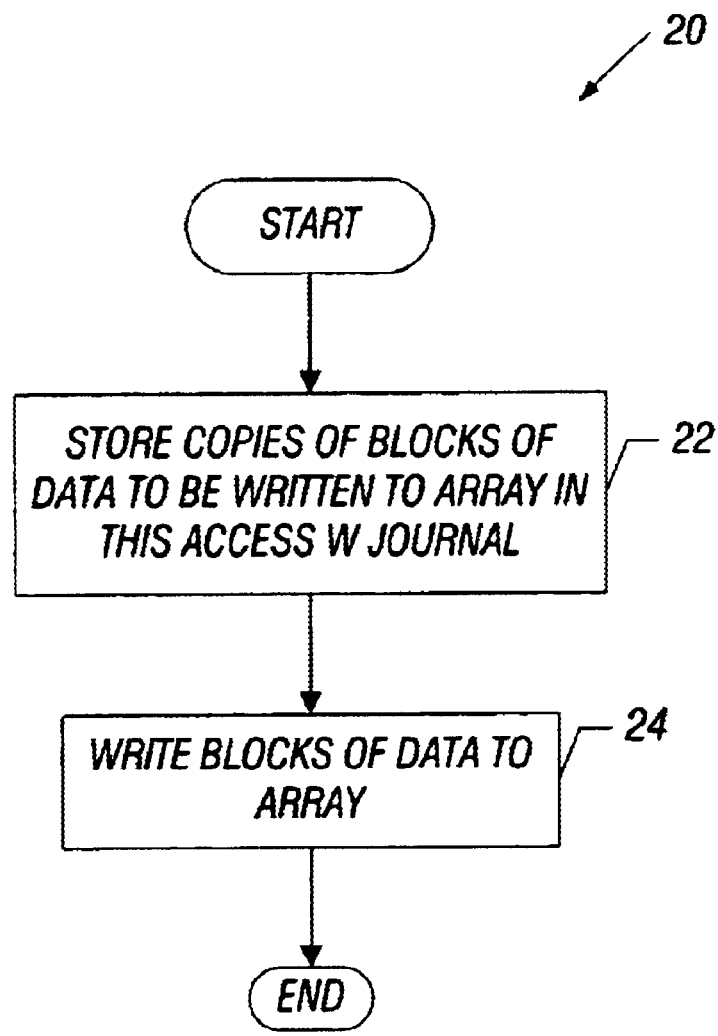
FIG. 2 is a flow diagram depicting a technique to write to a disk drive array of the computer system of FIG. 1 according to an embodiment of the invention.

Thus, in light of the foregoing discussion, in some embodiments of the invention, a particular server 12 that accesses the RAID array 14 may perform a technique 20 that is depicted in FIG. 2. In this technique 20, the server 12 stores (block 22) copies of blocks of data to be written to the array 14 in this particular access into the journal 15, thereby defining the open write transactions for the access. Next, the server 12 proceeds with the access by writing (block 24) the blocks of data (as posted in the journal 15) into the RAID array 14.

Figure 3:
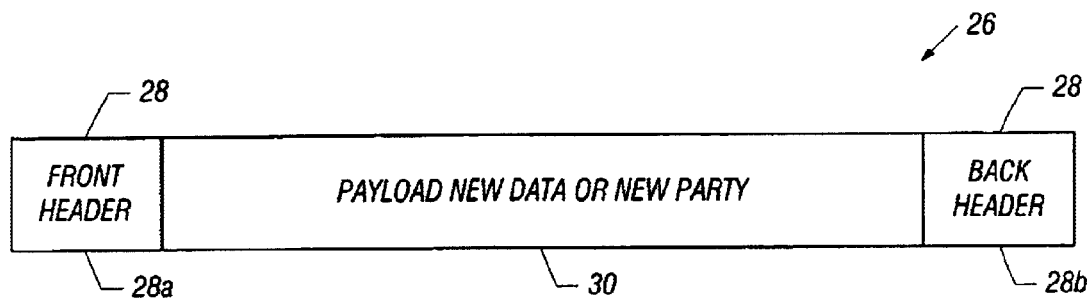
FIG. 3 is an illustration of a segment according to an embodiment of the invention.

In some embodiments of the invention, for storage of transaction information, as well as user data and parity data, an abstract object called a transaction container may be used. In this manner, a transaction container may be formed from transaction container segments 26, one of which is depicted in FIG. 3. Each segment 26 is associated with a particular write transaction and includes headers 28 that, among other things, are used to indicate whether payload data (i.e., the new parity or other data) of the segment 26 is valid. More particularly, a particular segment 26 may include a front header 28a and a back header 28b. The front 28a and back 28b headers enclose a payload section 30 that contains either the new user data to be written to the array 14 or the new parity data.

Figure 4:
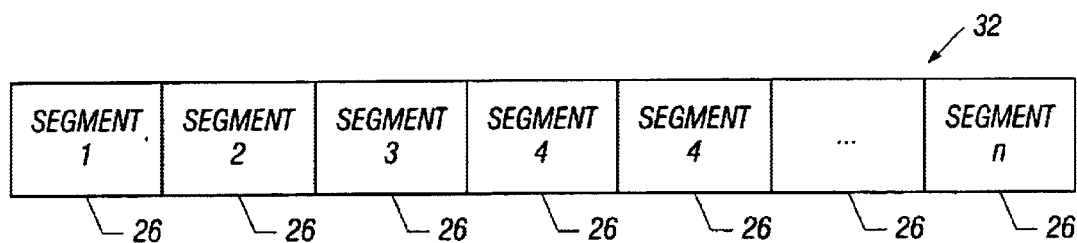
FIG. 4 is an illustration of a transaction container according to an embodiment of the invention.

An arbitrary number of transaction container segments 26 forms a transaction container 32, one of which is depicted, for example, in FIG. 4. In some embodiments of the invention, in a particular transaction container 32, all segments 26 are equal in size. Thus, the front 28a and back 28b headers for all segments 26 may always be placed at fixed offsets from the beginning of the transaction container 32. Such a design simplifies the management of the transaction container 32 and speeds up search operations for the headers 28 when a server fails and does not finish the transaction contained with the headers 28.

The front 28a and back 28b headers of each segment 26, in some embodiments of the invention, contain the same information if no corruption has occurred. In this manner, during recovery of open transactions, the selected substitute server compares front 28a and back 28b headers of a particular segment 26 to determine if their contents match exactly. If so, the substitute server further analyzes the headers 28 to determine if the segment 26 may be used to recover the transaction. Such a technique is useful, for example, to detect cases where the failure of the server 12 disrupts the recording of the open transactions themselves.

Depending on the segment size, the recording of new user data or new parity of a transaction might involve one or more segments 26. All headers of involved segments 26 must be equal, in some embodiments of the invention. Thus, the headers 28 must contain all information required for the recovery of open transactions.

For purposes of minimizing data transfer times during the recording of a particular open transaction, the server 12 creates a scatter-gather list for all headers 28 and all payload sections 30 of all segments 26 involved in a particular transaction is created, and the server 12 records the records the complete transaction record to the journal 15 in one action using the scatter-gather list.

Figure 5:
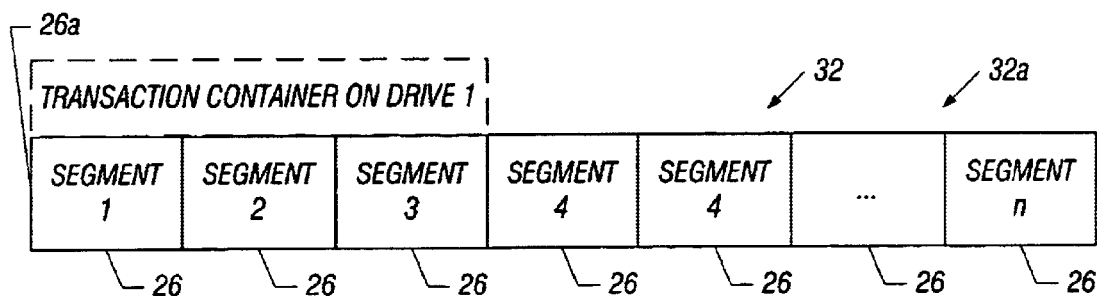
FIGS. 5, 6, 7, 8, 9 and 10 are illustrations of transaction containers according to examples of possible embodiments of the invention.
Figure 6:
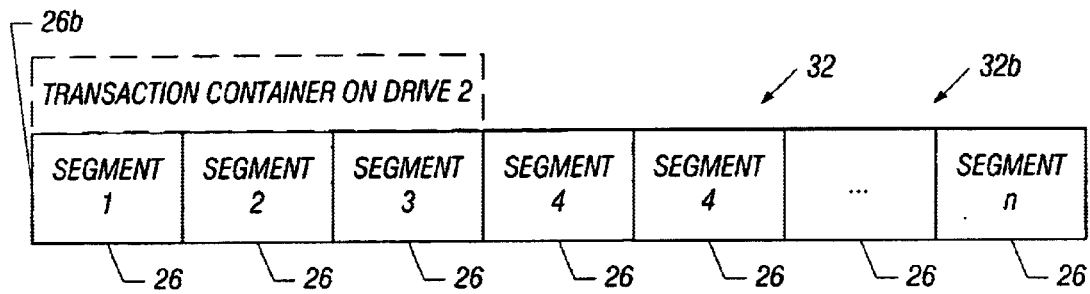
Figure 7:
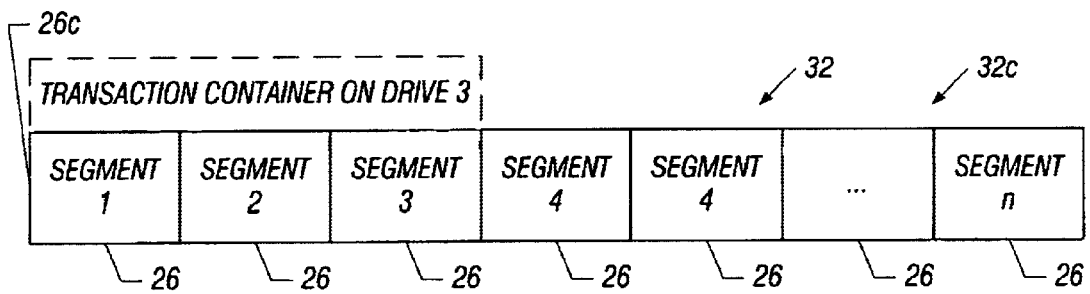

In some embodiments of the invention, the journal 15 may be stored on the disk drives of the RAID array 14. More particularly, in some embodiments of the invention, the journal 15 may be formed from several transaction containers 32, one of which is stored on each disk of the RAID array 14. As a more specific example, FIGS. 5, 6 and 7 depict specific containers 32a (FIG. 5), 32b (FIG. 6) and 32c (FIG. 7) that are located on separate disk drives of the RAID array 14. As an example, a particular partial or full stripe write operation to the RAID array 14 may involve, for example, block write operations to all three drives. Therefore, in a particular stripe write operation, the segments 26a (of the container 32a), 26b (of the container 32b) and 26c (of the container 32c) may be written by a particular server 12 to establish the open transactions for subsequent write operations to the corresponding drives of the RAID array 14.

Having one transaction container 32 per member disk drive of the array 14 provides the same failure protection for the transaction container 32 as for the array 14. Stated differently, when one of the drives of the RAID array 14 fails, then the transaction container 32 is still usable. For purposes of ensuring this, in some embodiments of the invention, the new user or new parity data is stored in the same transaction container 32 on the same disk drive (of the array 14) that the new user data and new parity will be written to. Alternatively stated, the user data and parity data write transaction records are striped across the array 14 in exactly the same way that the data and parity blocks are striped across the array 14. In contrast, if the transaction container is kept only on one disk drive of the array 14 and this disk drive fails, then the transaction records would be lost.

In some embodiments of the invention, the transaction container 32 is organized very similarly to a ring-buffer. In this manner, the storing of segments 26 always begins at segment one of the transaction container 32 after the access write was obtained by the servers 12, then the container 32 is filled up until the last segment 26 is used. At this point, a wrap-around is done and filling up of the transaction container 32 is continued starting at segment 26 one again. In this case it must be taken into account not to overwrite segments 26 that belong to transactions that are still open. This still may be achieved, for example, by explicitly tracking the state of the segments 26 (in some embodiments of the invention) or by implicitly adjusting the size of the transaction container 32 to ensure that the segments 26 do not overlap.

Figure 8:
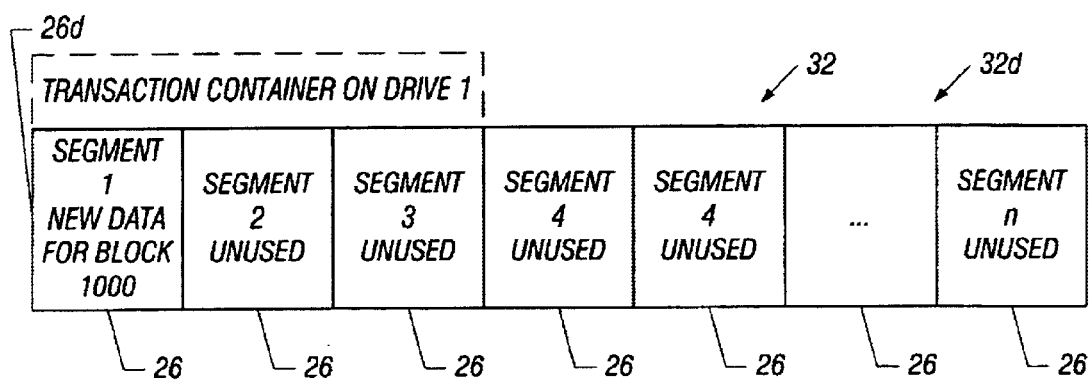
Figure 9:
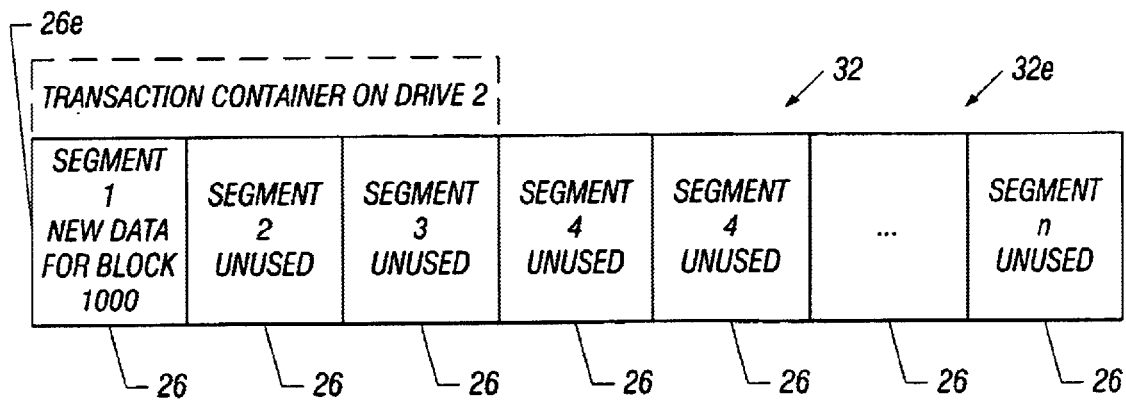
Figure 10:
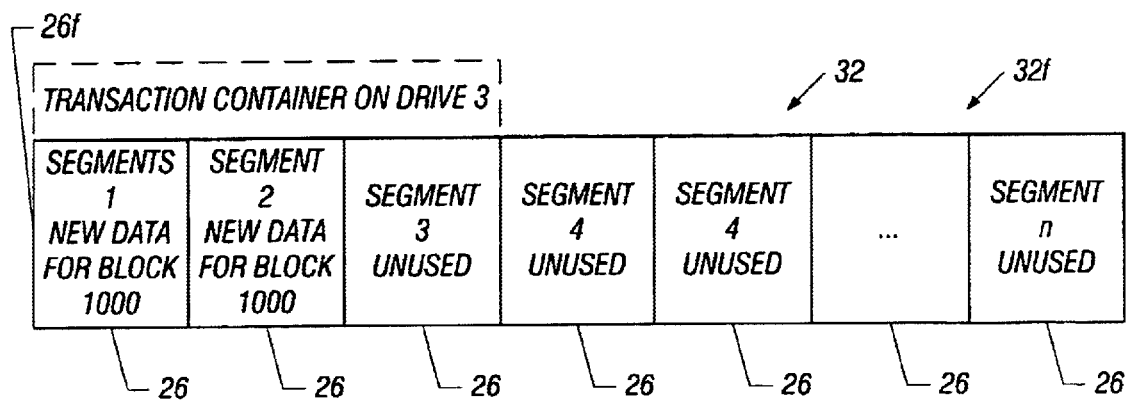

As a more specific example, FIGS. 8, 9 and 10 depict transaction containers 32d, 32e and 32f that are stored on different respective disk drives of the RAID array 14. In this example, two user data write operations occur: one to block number 1,000 on the disk drive on which the transaction container 32d is stored and another to block number 1,000 on the disk drive on which the transaction container 32e is stored. For this example, four resulting transactions are recorded. In this manner, new user data for the first transaction allocates segment number one of the transaction container 32d. The parity data is stored in segment number one of transaction container 32f. For this example, RAID4 is used, therefore, the disk drive on which the transaction container 32f is stored is a dedicated drive. For the remaining transactions, segment number one of the transaction containers 32e and segment number two of the transaction container 32f are used.

In some embodiments of the invention, the front 28a and back 28b headers include the following information: a header version number, to allow background compatibility; a time stamp, which may be a counter (a 32-bit counter, for example); I/O specific information, such as starting block number and block count of the new data and new parity I/O; a flag that identifies the type of the payload, either new user data or new parity; the number of segments 26 used by the recorded transaction; and a transaction counter that is used to sort the segments 26 ascending in time during transaction recovery. Whenever the access right is granted to a new server, then a time stamp counter is incremented by one. This allows identification of all segments 26 that were or should had been written during one single ownership of a particular access to the array 14.

When one of the servers 12 fails, the remaining servers 12 elect a substitute server 12 to perform the transactions that were recorded in the journal 15 by the failed server 12. For recovery of open transactions, the basic idea is to retrieve all valid segments 26 containing new data and new parity from the transaction containers 32 and write the new data and new parity to corresponding blocks on the disk drives of the array 14. In order to do this, the substitute server first reads and analyzes the segment 26 headers. The information in the headers is used to qualify the segments 26, and to check whether the segments 26 do contain valid transactions or not. For segments 26 to qualify for recovery of transactions, the time stamp must match the time stamp generated for the latest ownership of the array 14, the number of segments 26 found for a single transaction much match the number of segments 26 recorded in the headers, etc.

During recovery, before all qualified segments 26 are written to the corresponding disk drives using the I/O specific information in the headers 28, the starting point in the transaction container 32 is found. As the transaction container 32 is organized very similar to a ring-buffer, the starting point may not, and in almost any cases will not be, the first segment 26 of the transaction container 32. For purposes of finding the starting point, the substitute server 12 evaluates the transaction counter in the segment 26 headers. In this manner, the segment 26 with the lowest transaction counter is then elected as the starting point.

The substitute server 12 then proceeds with retrieving transactions, starting at the oldest ones and proceeding towards newer ones. This way, only the newest set of new user data and new parity data survives, even if some transactions overlap. Note, that this technique does not take care of, whether a transaction still was open at the time of the failure or not. All valid transactions found in the transaction container 32 are simply re-done.

As mentioned above the transaction container 32 can reside in any kind of storage. The specific details of the storage device type is kept hidden by an abstraction layer.

Figure 11:
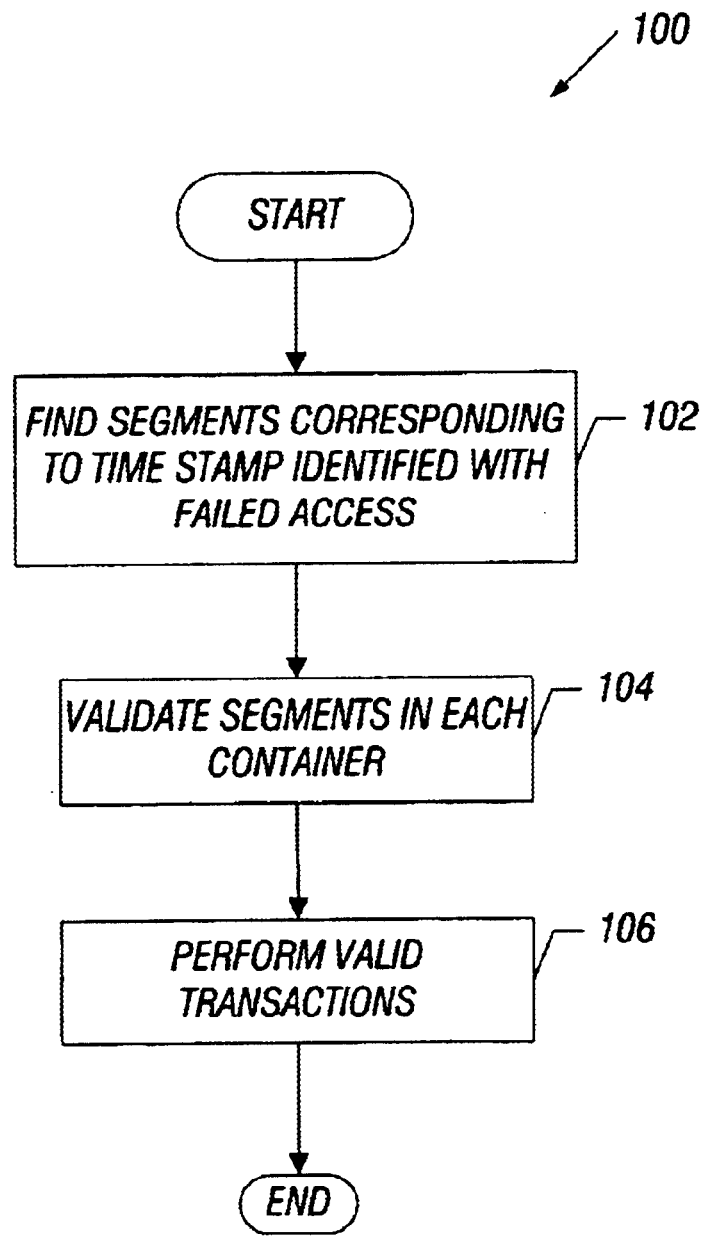
FIG. 11 is a flow diagram depicting a technique to reconstruct a server access according to an embodiment of the invention.

To briefly summarize, in some embodiments of the invention, the elected substitute server 12 may use a technique 100 that is depicted in FIG. 11. In this technique 100, the server 12 finds (block 102) segments 26 that correspond to the time-stamp that is identified with the failed access. The server 12, pursuant to the technique 100, then validates (block 104) the segments 26 in each container 32. With these valid data segments, the server 12 then performs (block 106) the valid stored transactions.

It is important to detect when write transactions have not been completed. In such case, the copies of the user data and the parity data provided through the transaction containers can be resurrected. In accordance with one embodiment of the present invention, one sector of two or more array member drives may be reserved to store information about the state of the transaction containers that are also located on those member drives. The reserved sectors, called close records, may not be visible to the customer or end user in some embodiments.

A close record may reflect one of two states of the transaction container on the corresponding disk. The open state indicates that the write transaction has not completed and the closed state indicates write transaction completion. If the close records of all array member drives indicate that the transaction containers are all closed then no incomplete write transactions have occurred and no recovery is needed. If only one of the close records of all the array member drives indicates that the transaction container is not closed, then incomplete write transactions may be present and transaction recovery action may be triggered.

In some embodiments, close records may be provided on only a subset of the array member drives. For RAID 4 and 5, two drives may be sufficient as the array still will be usable when only one drive fails. If two drives fail, then the array will be inoperable in any case. If a single failed drive is one of two drives that contain the close records, the other drive, also carrying a close record, allows control of the state of the transaction containers. If, in the second case, both close records were on failed drives, this would not matter since the array is inoperable in any case. In some embodiments, it may be desirable nonetheless to maintain close records on three array member drives for additional security.

Figure 12:
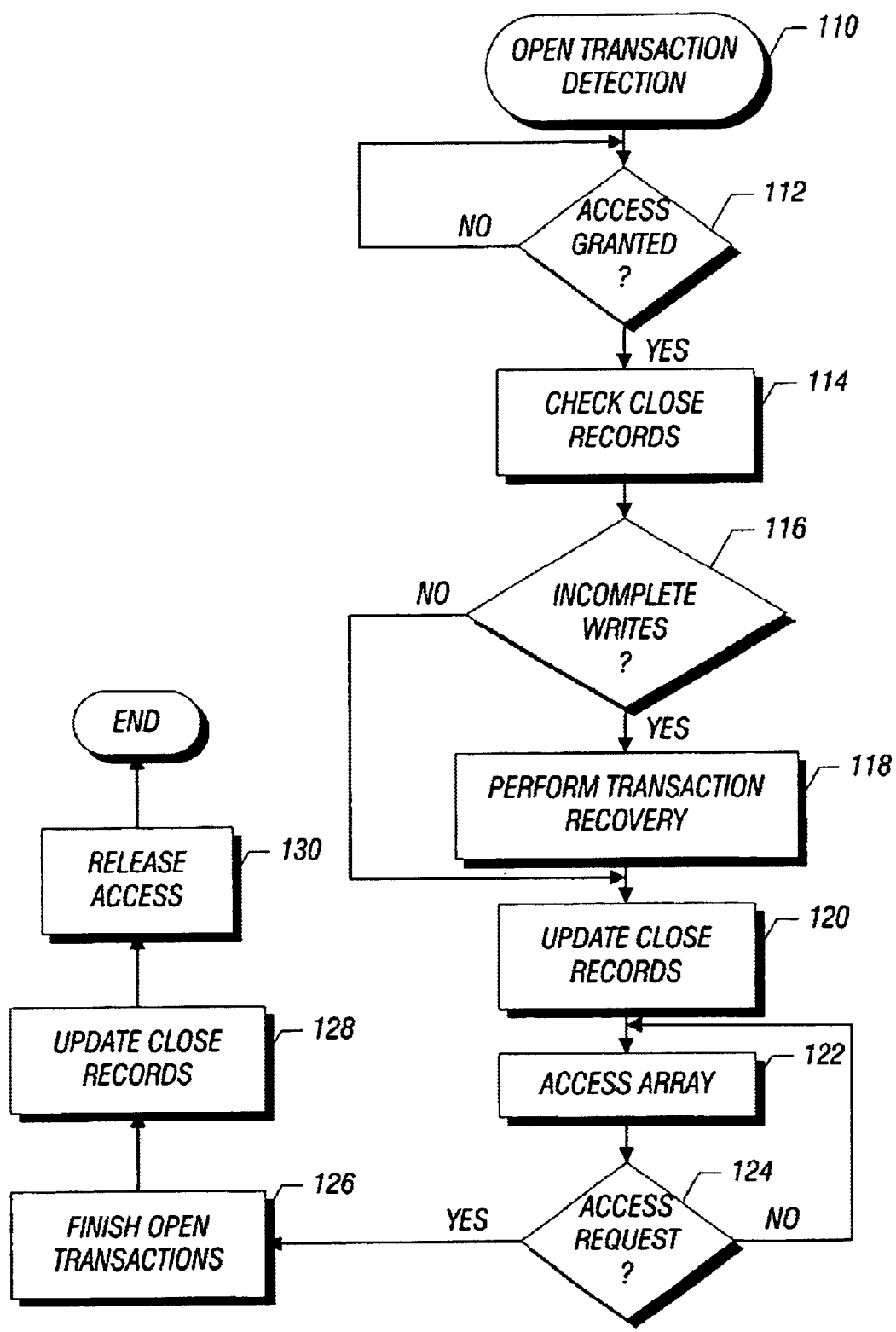
FIG. 12 is a flow diagram depicting a technique for detecting open write transactions to mass storage according to an embodiment of the invention.

Referring to FIG. 12, whenever it is granted the right to access the array, as determined in diamond 112, a server initially checks to determine if the close records indicate incomplete write transactions, as indicated in block 114 and diamond 116. If there are open transaction containers, the transaction recovery may be performed as indicated in block 118. If no incomplete writes were detected, then the transaction recovery step may be bypassed. Next, as indicated in block 120, the close records are updated to reflect that the transaction containers are open. The array may then be accessed as indicated in block 122. When another server requests access to the array, as indicated in diamond 124, the open transactions may be finished as indicated in block 126. The close records are updated as indicated in block 128 to indicate that those containers are closed and access to the array may be released as indicated in block 130.

The embodiment shown in FIG. 12 may also be utilized independently of the transaction container techniques described herein to keep track of write transaction states of an array or even a disk drive. In such case, instead of triggering a transaction recovery as indicated in block 118, other actions may be initiated such as user notification.

Since, in some embodiments, the close records that serve as state variables for the transaction containers are stored with the transaction containers on the array member drives, all data and information needed for failure protection is kept on the same storage media as the data being protected. Keeping the close records on the array member drives provides a comparable failure protection for both the close records and the array. In other words, when the array falls from ready mode to degraded mode, the close records are still usable. This means that it is possible to recover from double failures, where the server owning the access write fails and simultaneously the array falls from ready to degraded mode.

In some embodiments, keeping the close records on the member disk drives of the array means that concurrent failure of all servers may still be recoverable. The array can still be migrated to a new server or cluster environment and all open transactions can be finished, thereby assuring consistency between data and parity. This may not be possible when the close records reside on the local memory of a controller card.

Figure 13:
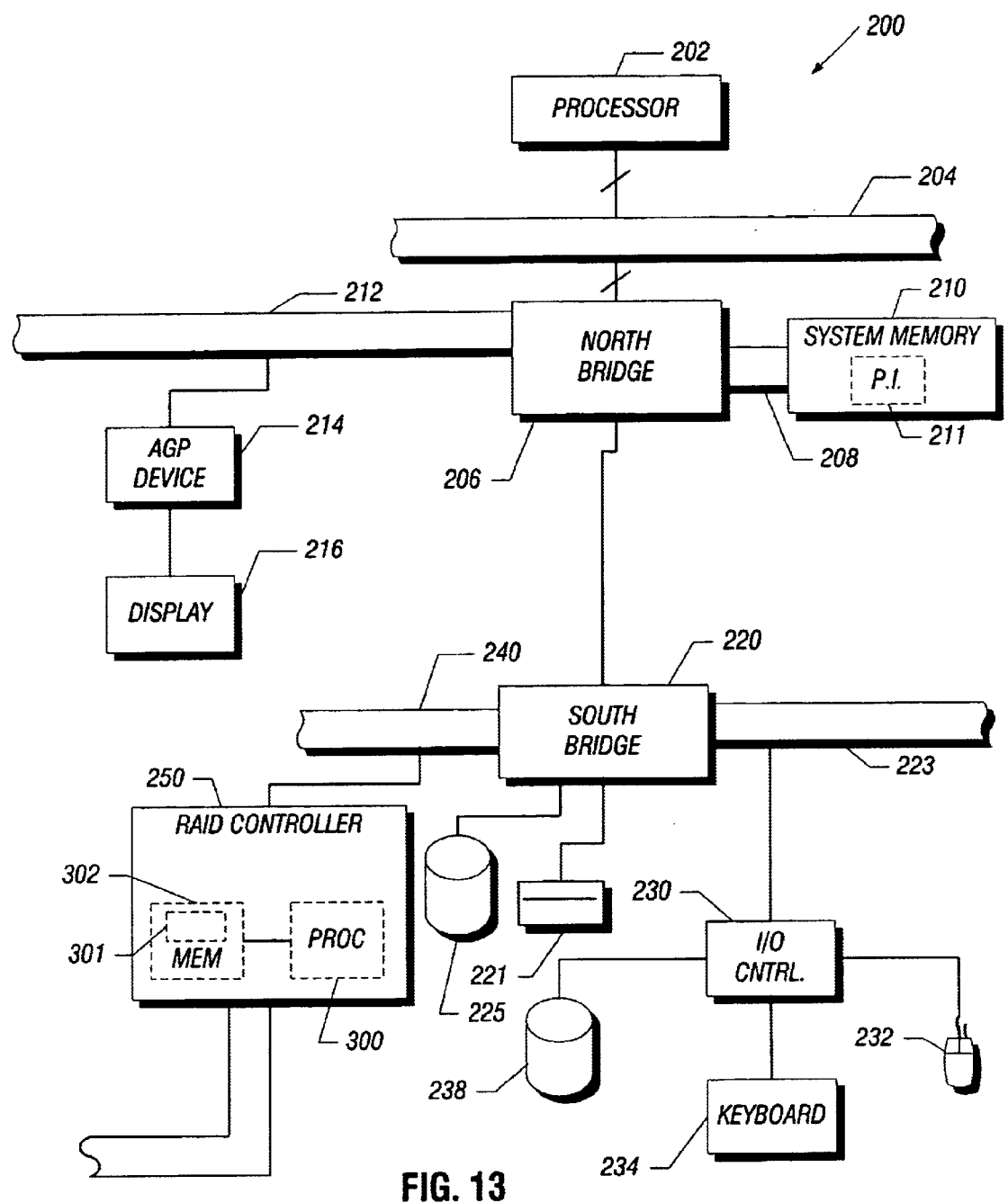
FIG. 13 is a schematic diagram of a server according to an embodiment of the invention.

In some embodiments of the invention, the server 12 maybe a computer, such as an exemplary computer 200 that is depicted in FIG. 13. In this manner, referring to FIG. 13, this computer 200 may include a processor (one or more microprocessors, for example) 202 that is coupled to a local bus 204. Also coupled to the local bus 204 may be, for example, a memory hub, or north bridge 206. The north bridge 206 provides interfaces to the local bus 204, a memory bus 208, an Accelerated Graphics Port (AGP) bus 212 and a hub link. The AGP is described in detail in the Accelerated Graphics Port Interface Specification, Revision 1.0, published on Jul. 31, 1996, by Intel Corporation of Santa Clara, Calif. A system memory 210 may be accessed via the system bus 208, and an AGP device 214 may communicate over the AGP bus 212 and generate signals to drive a display 216. The system memory 210 may store various program instructions 211, such as instructions related to electing the substitute server and performing the transactions recorded by a failed server should the computer system 200 be elected the substitute server and instructions related to detecting open write transactions. In this manner, in some embodiments of the invention, the instructions cause the processor 202 to perform one or more of the techniques that are described above.

The north bridge 206 may communicate with a south bridge 210 over the hub link. In this manner, the south bridge 220 may provide an interface for an I/O expansion bus 223 and a Peripheral Component Interconnect (PCI) bus 240. The PCI Specification is available from The PCI Special Interest Group, Portland, Oreg. 97214. An I/O controller 230 may be coupled to the I/O expansion bus 223 and receive input from a mouse 232 and a keyboard 234, as well as control operations of a floppy disk drive 238. The south bridge 220 may, for example, control operations of a hard disk drive 225 and a CD-ROM drive 221. A RAID controller 250 may be coupled to the PCI bus 240 and establish communication between the RAID array 14 and the computer 200 via a bus 252, for example. The RAID controller 250, in some embodiments of the invention, may be in the form of a PCI circuit card that is inserted into a PCI slot of the computer 200, for example.

In some embodiments of the invention, the RAID controller 250 includes a processor 300 and a memory 302 that stores such as instructions 301 related to electing the substitute server and performing the transactions recorded by a failed server should the computer system 200 be elected the substitute server and instructions related to detecting open write transactions. In this manner, in some embodiments of the invention, the instructions cause the processor 300 to perform one or more of the techniques that are described above. Thus, in these embodiments, the processor 300 of the RAID controller 250 performs the RAID-related functions, instead of the processor 202. In other embodiments of the invention, both the processor 202 and the processor 300 may perform different RAID-related functions. Other variations are possible.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   writing data to a drive of an array of drives; and
   storing an indicator, separately from said data, in the array to indicated to a server that the write transaction was not completed.

2. The method of claim 1 comprising:
   writing blocks of data from a plurality of servers to an array of drives shared in common by the servers; and
   prior to the writing of each block of data to the array of drives, storing in a journal a copy of the block data to be written to the array and storing at least one header in the journal, said at least header indicating the copy was successively stored in the journal.

3. The method of claim 2, including storing transaction containers, each transaction container associated with one of the drives of the array and comprising segments, and each segment comprising a copy of a block of data written to the associated drive.

4. The method of claim 3, including storing each transaction container on the associated drive.

5. The method of claim 2, including storing only copies of most recent blocks of data written to the array.

6. The method of claim 1 including resetting an indicator stored in the array after a write transaction is completed.

7. The method of claim 6 including providing said indicator in at least two drives of an array of drives.

8. The method of claim 7 including providing said indicator on at least three drives of an array of at least three drives.

9. The method of claim 1 including determining from said indicator that a write transaction was not completed.

10. The method of claim 9 including automatically performing transaction recovery in response to the detection that a write transaction was not completed.

11. An article comprising a medium storing instructions that, if executed, enables a processor-based system to perform the steps of:
    writing data to a drive of an array of drives; and
    storing an indicator, separately from said data, in the array to indicate to a server that the write transaction was not completed.

12. The article of claim 11 further storing instructions that enable a processor-based system to perform the steps of writing blocks of data from a plurality of servers to an array of drives shared in common by the servers and prior to writing of each block of data to the array of drives, storing in a journal a copy of the block data to be written into the array and storing at least one header in the journal, said at least one header indicating the copy was successively stored in the journal.

13. The article of claim 12 further storing instructions that enable the processor-based system to perform the steps of storing a journal comprising transaction containers, each transaction container associated with one of the drives of the array and comprising segments, and each segment comprising a copy of a block of data written to the associated drive.

14. The article of claim 13 further storing instructions that enable the processor-based system to perform the step of storing each transaction container on the associated drive.

15. The article of claim 12 further storing instructions that enable the processor-based system to perform the step of storing only copies of most recent blocks of data written to the array.

16. The article of claim 11 further storing instructions that enable the processor-based system to perform the step of resetting an indicator stored in the array after a write transaction is completed.

17. The article of claim 16 further storing instructions that enable the processor-based system to perform the step of providing said indicator in at least two drives of an array of drives.

18. The article of claim 17 further storing instructions that enable the processor-based system to perform the step of providing said indicator on at least three drives of an array of at least three drives.

19. The article of claim 11 further storing instructions that enable the processor-based system to perform the step of determining from said indicator that a write transaction was not completed.

20. The article of claim 19 further storing instructions that enable the processor-based system to perform the step of including automatically performing transaction recovery in response to the detection that a write transaction was not completed.

21. A system comprising:
a processor;
a memory storing a program to cause the processor to:
write data to a drive of an array of drive; and
stored an indicator, separately from said data, in the array to indicate to a server that the write transaction was not completed.

22. The system of claim 21 wherein said memory stores a program to enable the processor to:
write blocks of data to an array of disks shared in common by at least the computer system and at least one server,
prior to the writing of each block of data to the array of disks, store in a journal a copy of a block of data to be written to the array of disks and store at least one header in the journal, said at least one header indicating the copy was successfully stored in the journal.

23. The system of claim 22, wherein the journal comprises:
transaction containers, each transaction container associated with one of the disks of the array and comprising segments and each segment comprising a copy of a block of data written to the associated disk.

24. The system of claim 23, wherein each transaction container is stored on the associated disks.

25. The system of claim 22, wherein the journal comprises only copies of the most recent blocks of data written to the array of disks.

26. The system of claim 21, said memory further storing instructions that enable a processor-based system to reset an indicator stored in the array after a write transaction is completed.

27. The system of claim 26, wherein said array includes at least two drives and said memory further storing instructions that enable a processor-based system to provide said indicator for at least two drives of the array.

28. The system of claim 27, wherein said array includes at least three drives and said memory further storing instructions that enable a processor-based system to provide said indicator on at least three drives of the array.

29. The system of claim 21, said memory further storing instructions that enable a processor-based system to determine from said indicator that a write transaction was not completed.

30. The system of claim 29, said memory further storing instructions that enable a processor-based system to automatically perform transaction recovery in response to the detection that a write transaction was not completed.

* * * * *

UNITED STATES PATENT AND TRADEMARK OFFICE
CERTIFICATE OF CORRECTION

PATENT NO. : 6,910,100 B2
DATED : June 21, 2005
INVENTOR(S) : Norbert Lewalski-Brechter It is certified that error appears in the above-identified patent and that said Letters Patent is hereby corrected as shown below:

Column 8,
Line 18, "indicated" should be -- indicate --.

Column 9,
Line 38, "stored" should be -- store --.

Signed and Sealed this

Sixth Day of September, 2005

JON W. DUDAS
*Director of the United States Patent and Trademark Office*